United States Patent [19]

Baldwin

[11] Patent Number: 4,994,987

[45] Date of Patent: Feb. 19, 1991

[54] IMAGE ACCESS SYSTEM PROVIDING EASIER ACCESS TO IMAGES

[75] Inventor: Dwight G. Baldwin, Oakdale, Minn.

[73] Assignee: Minnesota Mining and Manufacturing Company, St. Paul, Minn.

[21] Appl. No.: 455,834

[22] Filed: Dec. 15, 1989

Related U.S. Application Data

[63] Continuation of Ser. No. 361,822, Jun. 1, 1989, abandoned, which is a continuation of Ser. No. 123,188, Nov. 20, 1987, abandoned.

[51] Int. Cl.$^5$ .............................................. G09B 7/06
[52] U.S. Cl. .................................... 364/518; 434/305; 434/315; 434/311
[58] Field of Search .............................. 364/518–521, 364/522, 525; 340/747, 732, 750, 752; 434/308–311, 314, 315, 316; 235/380, 383, 470

[56] References Cited

U.S. PATENT DOCUMENTS

| 3,855,619 | 12/1974 | Kral et al. ...................... 434/311 X |
| 3,979,770 | 9/1976 | Wild ................................ 434/311 X |
| 4,425,099 | 1/1984 | Naden ............................. 434/311 X |
| 4,555,859 | 12/1985 | Corso .............................. 434/305 X |
| 4,616,327 | 10/1986 | Rosewarne et al. ................ 364/518 |
| 4,639,225 | 1/1987 | Washizuka ........................ 434/308 |
| 4,673,357 | 6/1987 | Ito ................................... 434/311 |
| 4,684,548 | 7/1987 | Lemelson ...................... 434/308 X |
| 4,729,564 | 3/1988 | Kung et al. ..................... 434/311 X |

FOREIGN PATENT DOCUMENTS 42155 12/1981 European Pat. Off. ............ 434/308

Primary Examiner—William M. Shoop, Jr.
Assistant Examiner—A. Jonathan Wysocki
Attorney, Agent, or Firm—Donald M. Sell; Walter N. Kirn; Jack V. Musgrove

[57] ABSTRACT

An image access, retrieval, and display system provides a simplified system for randomly accessing stored images. Image access documents having a human readable representation of an image and machine readable image access information are placed in an image access document reader which transmits the image access information to the image display system causing the image to be displayed.

18 Claims, 4 Drawing Sheets

4,994,987

IMAGE ACCESS SYSTEM PROVIDING EASIER ACCESS TO IMAGES

This is a continuation of application Ser. No. 07/361,822 filed June 1, 1989, which is a continuation of application Ser. No. 07/123,188 filed Nov. 20, 1987, now abandoned.

TECHNICAL FIELD

The present invention relates to systems for the retrieval of electronically stored images, and more particularly to systems capable of randomly retrieving such images.

BACKGROUND OF THE INVENTION

In many fields of endeavor, images are stored for later access and examination. For example, X-ray photographs and other images are stored for later study by medical personnel. Similarly, engineering drawings may be stored for later recall. In each of these applications, as is true in many others, the stored images must be able to be randomly accessed in order to be effectively used. One method of storing such images and allowing random access is to simply store copies of the images on paper or another suitable medium. As the number of such images or documents stored becomes large, however, the space required to so store the images can become great. Furthermore the problems associated with locating a particular image can also be difficult.

An alternative to storing the actual images or documents is the storing of electronic representations of those images from which a computer can electronically reconstruct the image and display it on a suitable device. Typically such systems allow random access to documents by recalling a selected document when a reference number or name associated with that document is typed on a keyboard or keypad. An inherent disadvantage of such a system lies in the fact that the reference numbers or names must be recorded and recalled and correctly entered in order to access selected documents.

A field where easy access to documents is important is that of using images in presentations. Studies have indicated that the use of visual aids, such as transparencies displayed by an overhead projector, can greatly increase the effectiveness of speakers. The effectiveness of a presentation is, however, greatly reduced, or even eliminated, if the speaker must search for a particular transparency. Even when the transparencies are properly ordered at the beginning of a speech, audience interaction or other factors may require the speaker to depart from the prepared outline, inducing such searching.

The use of computer-generated images which may be directly projected by a large screen television or produced on a display such as a liquid crystal display and projected by a conventional overhead projector helps to alleviate problems associated with such searching. A problem that does exist with such systems, however, relates to the way images are accessed. Typically such computerized image display systems permit display of images either in a pre-set sequence, or randomly using a keypad as described previously. If sequential access is used, a speaker must display all images in the predetermined sequence even if some images are to be skipped. Similarly in order to return to a previously displayed image, the speaker must step back through intervening images until the desired image is reached. Alternatively, if an image code is entered through a keypad the speaker must remember the code associated with a particular image and correctly enter it on the keypad in order to cause the image to be displayed. Entry of an incorrect image could cause the wrong image, or no image, to be displayed. Even if only correct images are displayed the pause which occurs while the access code is entered may be distracting to the audience.

DISCLOSURE OF INVENTION

The present invention overcomes the problems associated with previous systems by providing means which permit a user to easily access any of a large number of presentation images in any desired order. Means for accomplishing the advantages of the present invention include an image access device which can communicate with existing retrieval systems to provide user friendly access to stored images.

In using the system of the present invention sets of image information are generated, each set of image information corresponding to an image to be displayed, such that the desired image may be generated from the image information. Image access documents are prepared containing, in machine readable form, either the image information itself or image access information which allows the system to locate the desired image in a computer mass storage device as well as human readable information in the form of a representation of the image to be displayed. Thus stored images may be randomly accessed by placing the desired image access document in an image access document reader. This overcomes the problem of recalling and entering reference numbers or storage locations for the images because the image access documents carry either such reference numbers or the computer representation of the image. Further the image access documents may be designed to be more easily searched than a set of, for example, overhead transparencies. For example, the image access documents may be credit card sized so they can easily be held and searched in the hand.

In one embodiment of the present invention, each image of a series of images has an access code associated therewith. An image access document is prepared for each image. Each image access document has the appropriate image access information, in machine readable form, thereon. Furthermore, typically on the other side of the image access document, the document contains human readable information about the image. Typically this would be a representation of the image. In use the image access document is inserted in an image access document reader, which obtains the image access information and transmits it to a computer. The computer uses the image access information to locate and obtain image information from which the desired image may be generated, generates the image, and causes the image to be displayed on an appropriate output device.

In an alternative embodiment of the invention the image access document contains, in machine readable form, all information required by the computer to generate the image. The computer may then generate the desired image directly from the information read from the document.

DETAILED DESCRIPTION

The present invention utilizes an image access document to direct a computer to select an image stored in a computer memory or other storage device for display on a display screen or, alternatively, to itself provide image data to a computer. The invention will be described with respect to a system for displaying presentation graphics, but those skilled in the art will readily perceive that it could be used for other applications in which graphics are to be displayed.

Figure 1A:
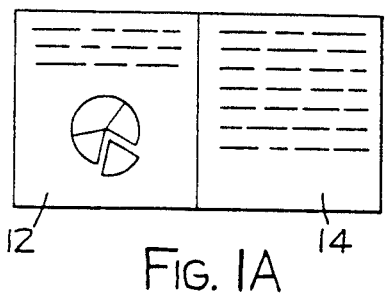
FIGS. 1A and 1B are drawings of an image access document to be used in the present invention.
Figure 1B:
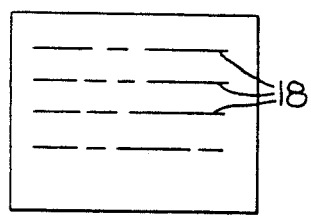

A preferred embodiment of an image access document is shown in FIGS. 1A and 1B. The image access document comprises a supportive substrate bearing information in human-readable and machine-readable forms. The supportive substrate may be, for example, paper or plastic. FIG. 1A shows a first side of the image access document that has regions 12 and 14. Region 12 has a human readable reproduction or representation of the image to be displayed when the card is used with the system of the invention. Region 14 provides additional space for notes describing the image. A person making a presentation using the system of the invention could, for example, include in region 14 additional information about the displayed image or an outline of the portion of the presentation to which that image applies. The other side of the image access document, shown in FIG. 1B, has machine readable information, shown schematically as 18, thereon. Machine readable information could be in the form of optically scannable information such as bar codes, a machine readable type face or other optically encoded information, or could be magnetically encoded information. If magnetically encoded information is to be used, a magnetic recording medium must be provided on the image access document. Machine readable information could also be provided in electronically readable form. Examples include capacitively or inductively readable information or information contained in a read only memory attached to or embedded in the image access document. Other types of machine readable information storage may also be used.

Prior to making a presentation using the system of the invention, image access documents must be prepared. The preparation of such documents involves associating a human readable image representative of an image to be displayed with image access information in machine readable form by placing both on the image access document. The image access information may be the storage address in a storage device, a reference number from which such a storage address may be calculated, or a complete description of the image from which a computer can generate and display the image.

Figure 2:
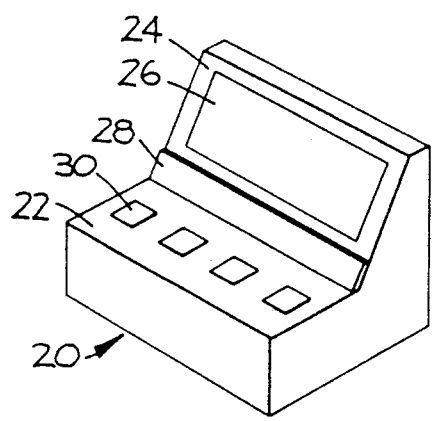
FIG. 2 is a drawing of an image access document reader for use in the present invention.

FIG. 2 shows an embodiment of a document reader which may be used in the invention. Document reader 20 includes a base portion 22 and an elevated portion 24. Elevated portion 24 includes a document reader mechanism 26. A clip 28 is provided for holding information containing image access documents in front of document reader mechanism 26. Alternatively clip 28 could be omitted by appropriately designing document reader 20. Additionally control switches such as control switch 30 may be included on document reader 20.

Figure 3:
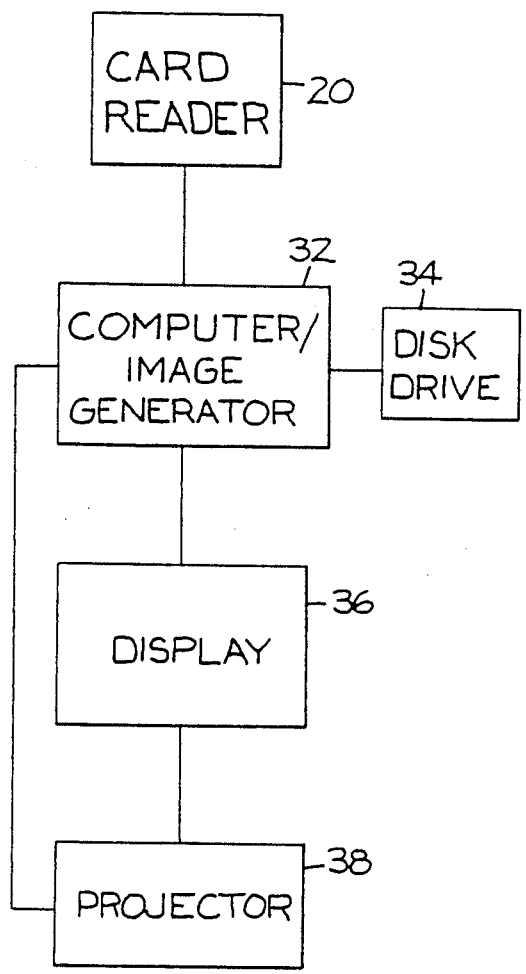
FIG. 3 is a block diagram of the invention.

FIG. 3 is a block diagram of the system of the invention. Document reader 20 provides control signals to computer/image generator 32. Document reader 20 need not be physically connected to computer/image generator 32, but could use a wireless signal transmission system. For example, electro-magnetic signals, such as infrared signals, could be used to carry information from document reader 20 to computer/image generator 32. Mass storage device 34 contains image information about each image to be used, from which the image may be generated. Computer/image generator 32 calculates an image storage address for the desired image and obtains the desired image information from mass storage device 34. Mass storage device 34 could, for example, be a magnetic or optical disk drive. Other mass storage devices could alternatively be used. The information obtained from mass storage device 34 is used by computer/image generator 32 to produce an electronic representation of the desired image in a memory buffer. When computer/image generator 32 has completed the generation of the electronic representation of the image it causes the image to be displayed on display screen 36. Display screen 36 may, for example, be a CRT display, a projection television display or a liquid crystal display which may be placed on an overhead projector to project images.

Alternatively to the forgoing, the mass storage device could be a collection of slides, in individually and randomly addressable locations. Computer/image generator 32 would then select a particular slide in response to signals received from document reader 20. The slide would then be loaded into a projector for display.

FIG. 3 also shows a connection from computer/image generator 32 to projector 38. If the chosen display system uses a projector such as an overhead projector, this connection will allow a presenter to control projector 38 from document reader 20. For example, document reader 20 may include a switch enabling a person using it to turn on the lamp in projector 38 when an image is to be displayed and to turn off the lamp at other times.

Figure 4:
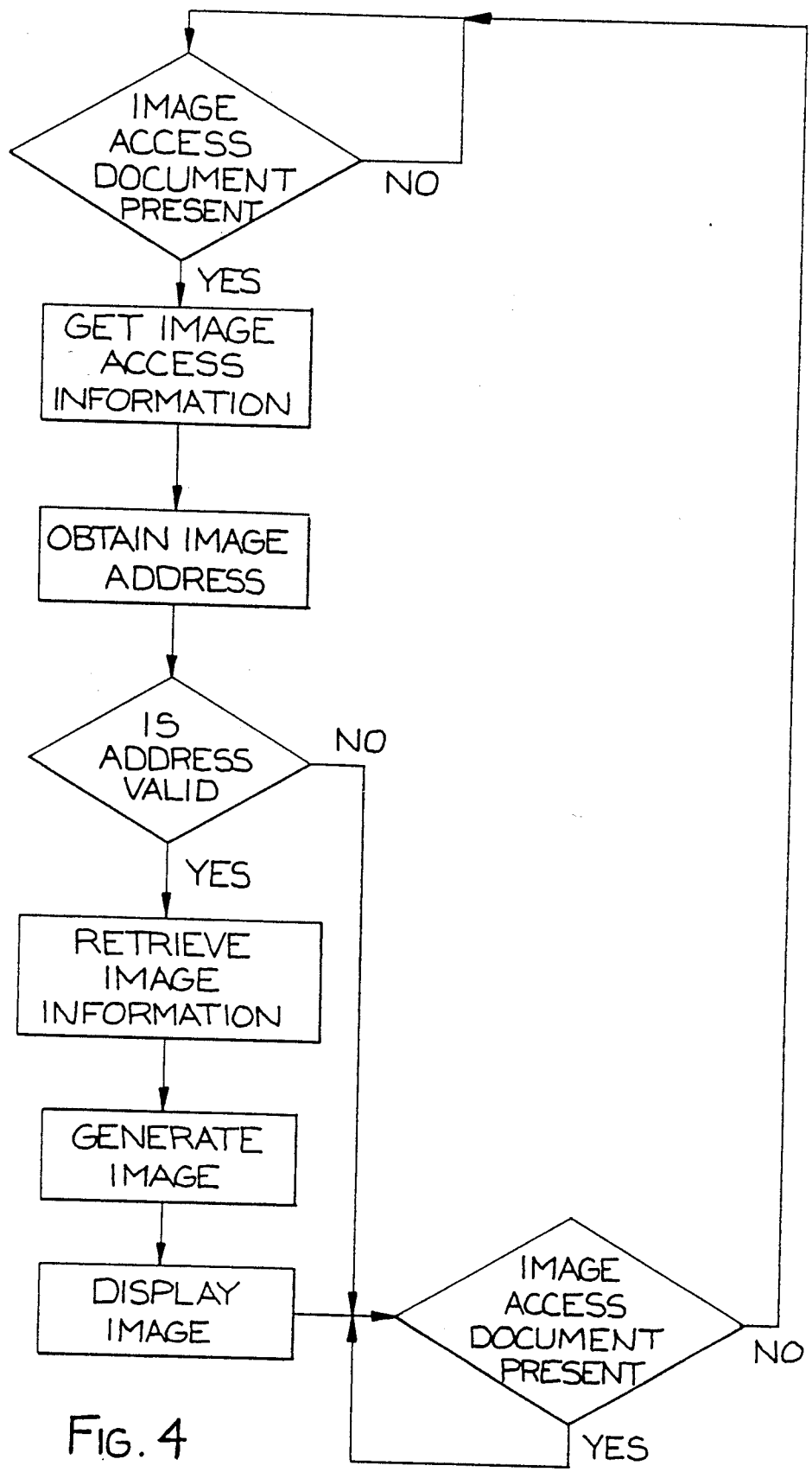
FIGS. 4, 5 and 6 are operational flow charts for systems according to the invention.

FIG. 4 is a flow chart of the actions taken by computer/image generator 32 of FIG. 3 during operation of the system. The cycle begins with computer/image generator 32 in an idle loop inquiring whether an image access document is present on document reader 20. If no image access document is present the loop is repeated until one is detected.

When an image access document is present the document image access information is read by card reader 20 and is transmitted to computer/image generator 32. Computer/image generator then determines the image storage location. This may be accomplished in a number of ways. For example, the document image access information may be a number which specifically references the image storage location. Alternatively, computer/image generator 32 may perform a simple calculation such as adding an offset to a number in the image access information to determine the image storage location. In a preferred embodiment, a lookup table is scanned until the image access information obtained from the document reader is located or is determined not to be present. Known techniques such as hashing or binary searching may be used to reduce the time required for such a scan.

If the desired image access information is located in the lookup table and additional information in the table indicates that the proper mass storage medium is available, the reference number is considered valid. For example, the table may indicate that the requested image is on a particular disk. If so, the system will check to insure that the specified disk is present before determining that the image storage address is valid. When a valid image storage address is obtained the image information is retrieved from the image storage location and the image is generated.

Computer/image generator 32 then enters another loop to determine whether the document is still present. As long as the document is still present, computer/image generator 32 remains in this loop. When computer/image generator 32 detects that the document has been removed, control is returned to the initial idle loop and the process repeated. The second idle loop is used to prevent the regeneration of an image which is already displayed. If this loop were not used, the image would be constantly turning on and off as it is regenerated.

When a reference number is determined to be invalid the system enters an idle loop and waits until a new document is presented. At that time the process repeats itself. Alternatively the system could return to the initial idle loop upon detection of an invalid reference number. A third alternative would be to return to the initial idle loop upon detection of an invalid reference number until such invalid reference numbers have been detected a predetermined number of consecutive tries. These two alternatives allow for the possibility that the image access document was incorrectly read, giving the system a chance to correct for such an error.

Figure 5:
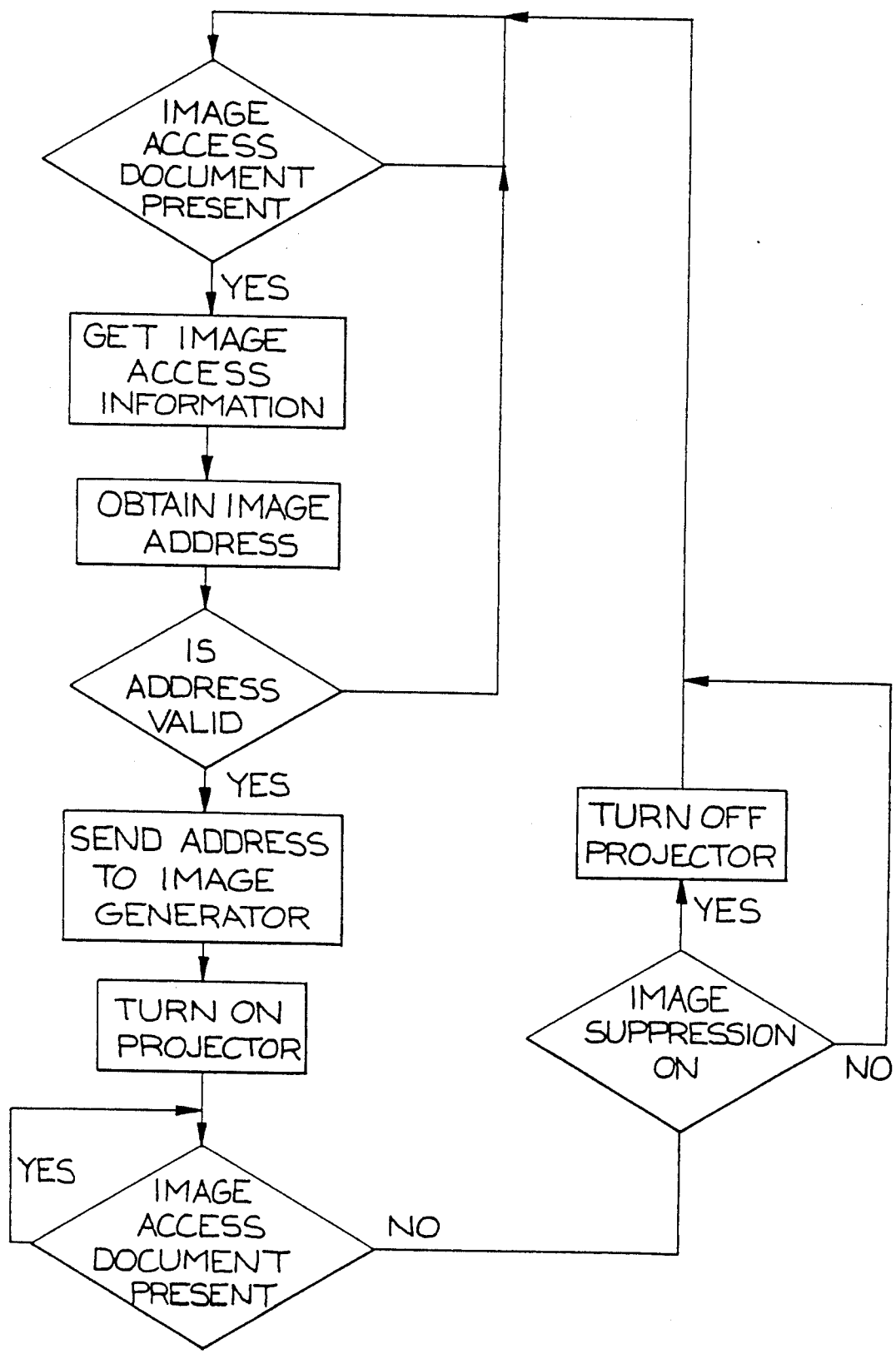

FIG. 5 is a flow chart for another system incorporating the invention. In the system which would utilize the flow chart of FIG. 5, however, the computer/image generator 32 of FIG. 3 has separate hardware for retrieving an image and generating the image so that the main processor does not need to perform this function. Additionally, the card reader has a switch, the setting of which determines whether the image displayed will continue to be displayed after the image access document has been removed from the card reader.

The system of FIG. 5 begins in an idle loop similar to the initial loop of FIG. 4. If an image access document is found to be present on the document reader, a procedure similar to the procedure of FIG. 4 is followed, except that once the storage address has been located and determined to be valid the storage location is transmitted to the image generator which retrieves the image and builds it. Additionally the projector is illuminated to allow display of the generated image. If the reference number is determined to be invalid the system returns to the initial idle loop. This is an alternative to the procedure of FIG. 4 where the system waits until the image access document with an invalid reference number is removed from the document reader before attempting to read another document.

After illuminating the projector the system enters an idle loop where it remains until the image access document is removed from the document reader. When the document is removed, the system checks to see if image suppression is enabled. If so, the projector is turned off until another image access document with a valid document reference number is present on the document reader.

Figure 6:
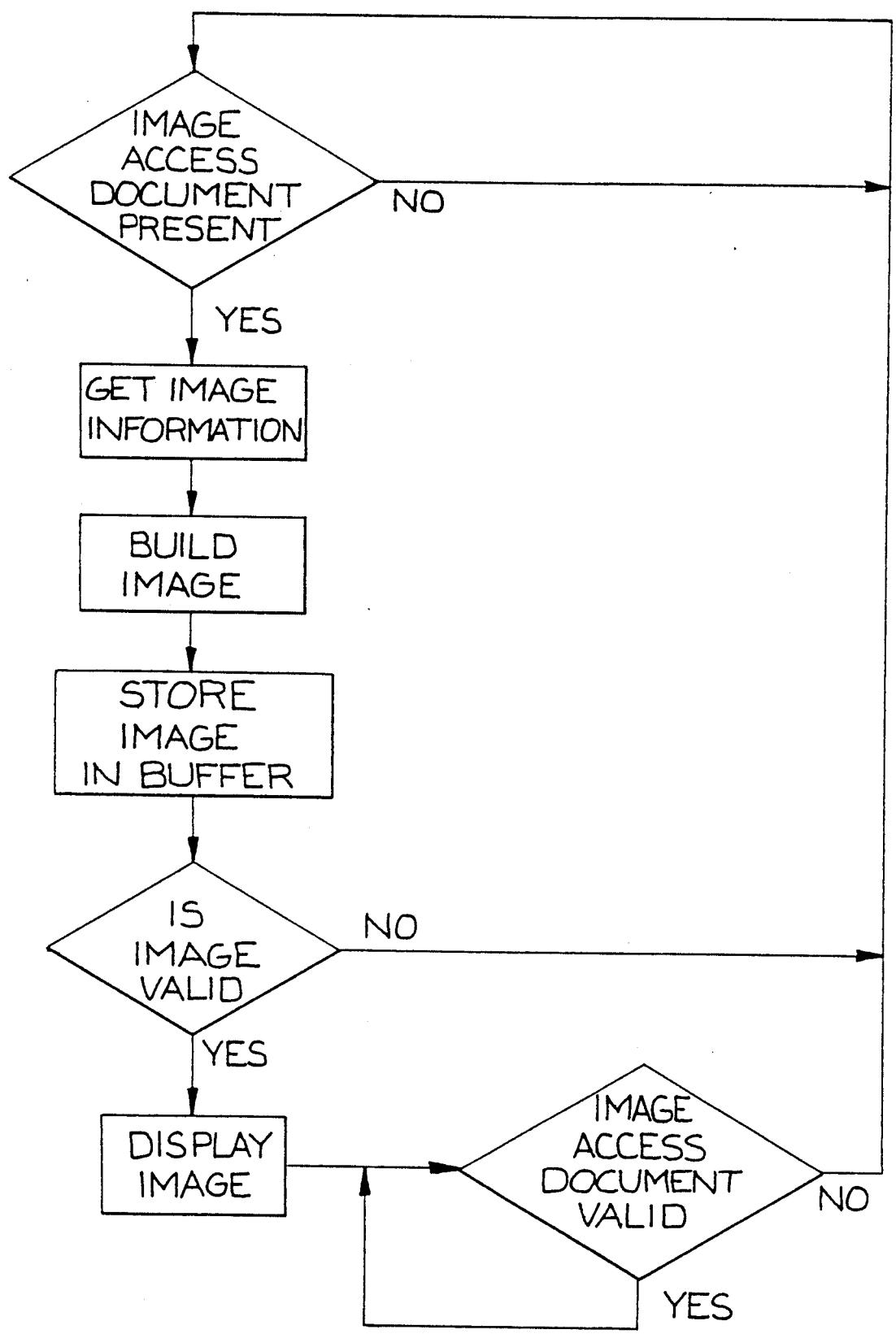

FIG. 6 illustrates an alternative embodiment of the invention. In the embodiment of FIG. 6 the image access document includes all of the information needed to generate an image without any requirement of disk access. Again an initial idle loop causes computer/image generator 32 to wait until a document is sensed to be present. Computer/image generator 32 then causes card reader 20 to read the image from the document and transmit it to computer/image generator 32. It then builds the image and stores that image in a buffer. A test is then made to determine whether a valid image has been generated. If not, the system returns to the initial idle loop. If the image is valid, it is sent to the display screen for display. Computer/image generator 32 then enters another idle loop to wait until the image access document is removed from card reader 20. When that occurs it returns to the initial idle loop.

I claim:

1. A system for retrieving image information stored in a storage device and displaying images, said image information having a predetermined storage address in said storage devices, said system comprising:
   an image access document, separate from said storage device, comprising a supportive substrate containing human readable information and machine readable information, said human readable information being representative of said image information stored in said storage device, and said machine readable information being associated with said predetermined storage address;
   image access document reading means for reading said machine readable information;
   image address correlation means for accepting said machine readable information from said image access document reading means and correlating said storage address associated therewith;
   image retrieval means for accepting said storage address from said image address correlation means and retrieving said image information stored at that address; and
   display means connected to said image retrieval means for displaying an image corresponding to said image information.

2. The system of claim 1, wherein said image access document reading means includes means for reading information provided in optically readable form.

3. The system of claim 1, wherein said image access document reading means includes means for reading information provided in magnetically readable form.

4. The system of claim 1, wherein said image access document reading means includes means for reading information provided in electronically readable form.

5. The system of claim 1, wherein said display means produces an image capable of being projected by a projector for viewing by an audience.

6. The system of claim 5, wherein said display means comprised a liquid crystal display, the images produced by said liquid crystal display being capable of being projected by an overhead projector.

7. The system of claim 1, wherein said machine readable information is provided in optically readable form.

8. The system of claim 1, wherein said machine readable information is provided in magnetically readable form.

9. The system of claim 1, wherein said machine readable information is provided in electronically readable form.

10. A method of retrieving image information stored in a storage device and displaying images, said image information having a predetermined storage address in said storage device, said method comprising the steps of:

obtaining image access information from an image access document, said image access document being separate from said storage device, and further having human readable information representative of said image information;

calculating said storage address from said image access information;

retrieving said image information stored at said storage address; and displaying an image corresponding to said image information.

11. The method of claim 10 further comprising the step of determining whether a valid storage address has been calculated before retrieving said image information and only proceeding with subsequent steps if said storage address is valid.

12. An image access document for use in an image presentation system, said image access document comprising a supportive substrate containing machine readable information and human readable information, said human readable information being representative of an image stored in a separate storage device, said machine readable information being associated with a predetermined storage address in said storage device.

13. An image access document according to claim 12 wherein said machine readable information is provided in a form that can be read by means selected from the group consisting of optical means, electronic means, magnetic means or combinations thereof.

14. An image access document according to claim 12 wherein said substrate comprises paper.

15. An image access document according to claim 14 wherein said substrate comprises plastic.

16. An image access document according to claim 12 wherein said human read information and said machine readable information are on opposite sides of said substrate.

17. A system for producing visual images for an audience during a presentation by a speaker, comprising:

a plurality of image access documents, each said document having image retrieving, machine readable information and a visually readable image thereon, whereby said visually readable image may be previewed by the speaker;

a reading device having means for receiving one of said image access documents, means for reading said image retrieving information, and means for transmitting said information;

image storing and retrieving means for receiving said transmitted information and retrieving a stored image corresponding to said visually readable image on said one of said image access documents; and display means for presenting a visual image to the audience, said visual image corresponding to said stored image.

18. A system for presenting visual images to an audience, comprising:

an image access document having a human readable, visual image printed thereon, and having image access information in machine readable form;

a storage medium having machine readable data corresponding to said visual image, said machine readable data residing at a known address on said storage medium;

means for reading said image access information on said image access card;

means for correlating said image access information to said address;

means for displaying an image to the audience; and means for retrieving said machine readable data from said storage medium and transmitting it to said displaying means.

* * * * *